(12) United States Patent
Ngo

(10) Patent No.: US 6,885,463 B2
(45) Date of Patent: Apr. 26, 2005

(54) SENSOR DEVICE THAT PROVIDES PART QUALITY AND PROFILE INFORMATION

(75) Inventor: Kiet Ngo, London (CA)

(73) Assignee: OES, Inc., London (CA)

( * ) Notice: Subject to any disclaimer, the term of this patent is extended or adjusted under 35 U.S.C. 154(b) by 177 days.

(21) Appl. No.: 10/309,842

(22) Filed: Dec. 4, 2002

(65) Prior Publication Data

US 2003/0076509 A1 Apr. 24, 2003

Related U.S. Application Data

(63) Continuation-in-part of application No. 09/428,942, filed on Oct. 28, 1999, now Pat. No. 6,496,271.

(51) Int. Cl.[7] .............................................. G01B 11/24
(52) U.S. Cl. .................. 356/601; 356/614; 250/559.36
(58) Field of Search ............................... 356/601–623, 356/634, 635, 638, 640, 429–431, 394; 250/559.29, 559.36; 348/86, 125; 382/141; 29/564.4, 707, 720

(56) References Cited

U.S. PATENT DOCUMENTS

| 3,806,251 | A | * | 4/1974 | Dandliker et al. .......... 356/496 |
| 4,395,119 | A | | 7/1983 | Nakata et al. |
| 4,559,451 | A | | 12/1985 | Curl |
| 4,576,482 | A | * | 3/1986 | Pryor .......................... 356/612 |
| 4,649,621 | A | | 3/1987 | Dusel et al. |
| 5,293,220 | A | | 3/1994 | Fukuda et al. |
| 5,691,763 | A | | 11/1997 | Ichikawa et al. |
| 5,841,675 | A | | 11/1998 | Ngo |
| 6,055,329 | A | * | 4/2000 | Mufti ......................... 382/152 |
| 6,111,601 | A | * | 8/2000 | Adachi ........................ 348/92 |
| 6,496,271 | B1 | * | 12/2002 | Ngo ........................... 356/613 |

FOREIGN PATENT DOCUMENTS

| JP | 59216044 A | 12/1984 |
| JP | 61133844 A | 6/1986 |

OTHER PUBLICATIONS

Product Brochure—OES Strip Sensor Model 71—undated.
Product Brochure—OES Strip and Seal Sensor Model 97—undated.
Product Brochure—OES Strip/Seal Sensor Model 95—undated.

\* cited by examiner

*Primary Examiner*—Hoa Q. Pham
(74) *Attorney, Agent, or Firm*—Carlson, Gaskey & Olds

(57) ABSTRACT

A sensor device includes a source of radiation that irradiates a plurality of sensing elements. A test object is passed through the spacing between the source of radiation and the sensing elements so that the object blocks the radiation from at least some of the sensing elements. The sensor device provides two-dimensional profile information based upon which ones of the sensing elements are blocked from the radiation and an amount of time that the radiation is blocked at each sensing element. One example use of the inventive arrangement is for monitoring the quality of formed tube ends. Another example disclosed use is for monitoring the quality and characteristics of stripped wire ends.

20 Claims, 5 Drawing Sheets

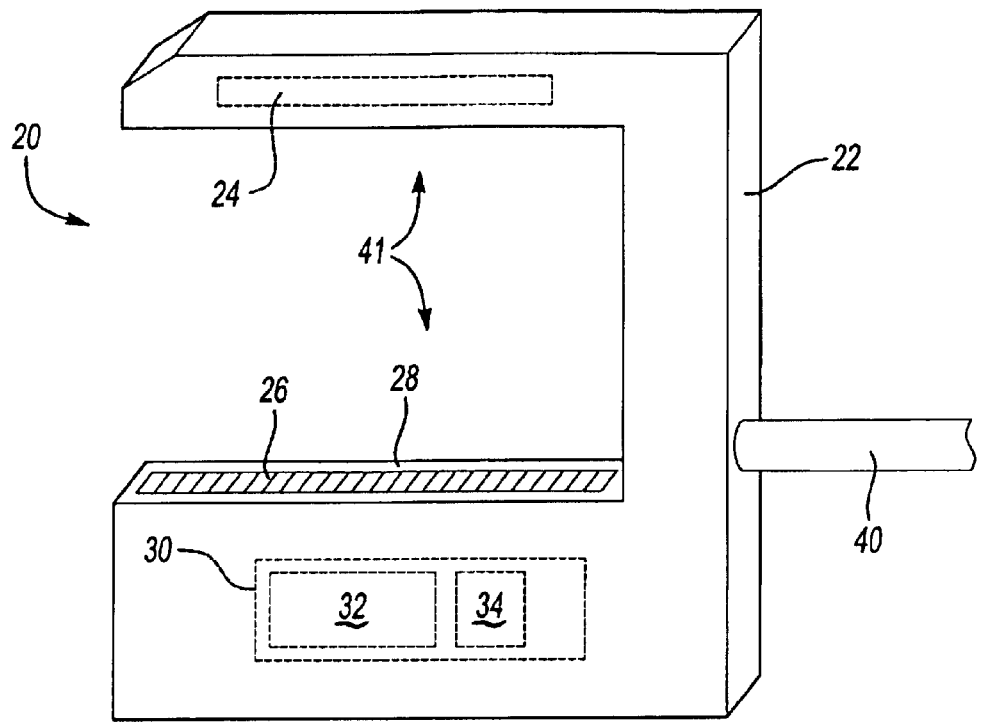
_Fig-1_
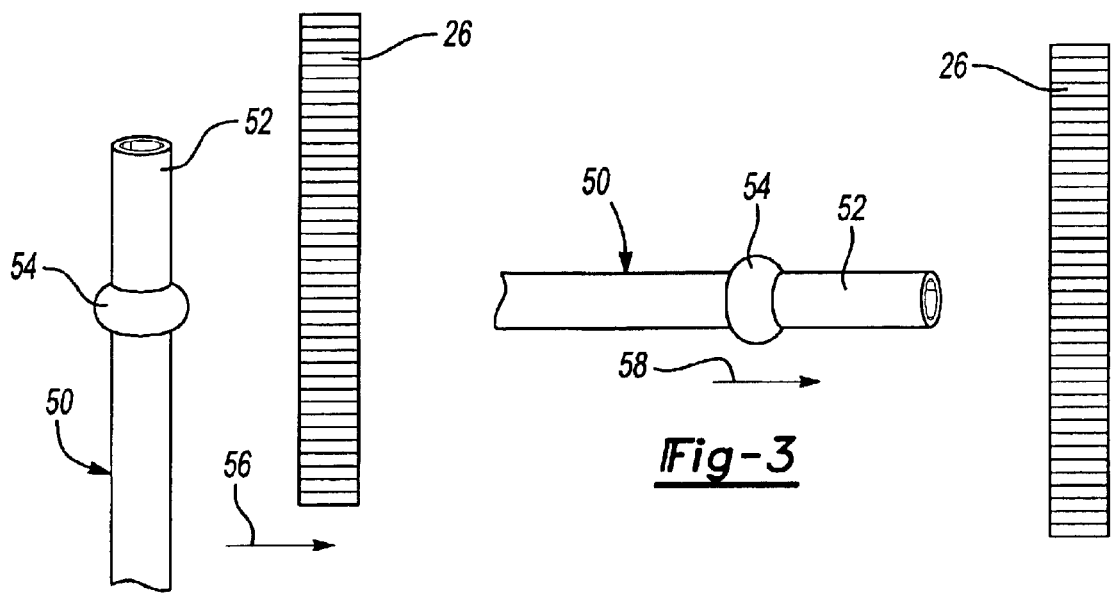
_Fig-2_     _Fig-3_

SENSOR DEVICE THAT PROVIDES PART QUALITY AND PROFILE INFORMATION

CROSS REFERENCE TO RELATED APPLICATIONS

This application is a continuation-in-part of U.S. application Ser. No. 09/428,942, which was filed on Oct. 28, 1999 now U.S. Pat. No. 6,496,271

BACKGROUND OF THE INVENTION

This invention generally relates to devices for inspecting the properties or condition of items such as formed tube ends or wires and associated insulation and seals.

For purposes of inspecting formed ends on tubes, two conventional techniques have been used. The characteristics and quality of the formed end of the tube are important so that appropriate connections are made in the application of such tubes, for example. Conventional inspection techniques include mechanical gauges or camera-based systems. Tooling marks, lighting conditions and space requirements have rendered camera-based inspection systems difficult to apply. The typical environment within which such systems are proposed to be used are relatively harsh for such camera systems, which increases the maintenance and support required to operate such systems. Camera-based systems have proven generally too expensive and not practical.

Mechanical gauges for inspecting tube ends are limited in several ways. The mechanical nature of such devices render them prone to wear, degradation and mechanical failure over time. Further, such gauges are configured for specific mechanical part dimensions, which does not allow them to be used for a variety of products.

A further drawback associated with mechanical gauges and camera-based systems is that they require the part to be stationary during the inspection process, which increases overall production time and decreases overall production efficiencies.

Another application for inspection technology is for inspecting wire strips that are used in automotive applications, for example.

Wire strip inspection devices are well known and used in the industry in processing machines to monitor the quality of wires used in making electrical connections. The typical concern is to verify that the insulation of the wire has been properly removed. Conventional wire strip inspection devices include contact sensors where the exposed, conductive portion of the wire makes contact with two mechanical plates to form a connection that confirms that the insulation has been removed.

Other types of sensors have been utilized that do not require contact with the conductive portion of the wire. In conventional non-contact sensors, the wire is moved through a sensing window. The sensor head is mechanically positioned or aligned in the path of the insulation shoulder so that the insulation shoulder passes through the sensing window. Two sensing beams are typically utilized and positioned so that the insulation interrupts the first beam while the exposed conductive portion interrupts the second beam. A determination is made based upon a relative percentage between pulse width signals generated when the wire passes through the beams.

Previously used sensing devices, however, are not without shortcomings and drawbacks. For example, mechanical setup is required to specifically accommodate any change in the expected strip length of the wire. Moreover, an operator typically is required to utilize trial and error to mechanically adjust the sensor over the travel position of the wire so that the individual beams are incident on the expected portion of the wire. Additionally, the wire-processing machine must be precisely calibrated to move each wire sample through the sensor at the exact same position or erroneous results are achieved.

Existing sensor arrangements do not provide sufficiently economical operation because of the large amount of operator input and sophistication that is required. Moreover, the large amount of precise and tedious adjustment required to accommodate different wire sizes, tolerances and seal applications introduces additional down time of a machine and the associated costs in loss of production time.

Additionally, previous devices are not capable of detecting all of the characteristics of a wire that ideally are monitored as part of the inspection process. For example, previously used sensors may be capable of detecting the presence of a seal on a wire but cannot determine the seal's orientation or condition.

Accordingly, there is a need for an improved inspection device that has greater capabilities, is more effective and does not require a large amount of operator input or adjustment. This invention provides such a system and avoids the shortcomings and drawbacks of the prior art discussed above.

SUMMARY OF THE INVENTION

In general terms, this invention is a sensor device that provides two-dimensional profile information regarding an object such as a formed tube end or a wire end.

A sensor device designed according to this invention includes a source of radiation. A plurality of radiation sensing elements are spaced from the source of radiation. A controller determines an amount of time that an object moving through the spacing between the radiation source and the sensing elements blocks each of the sensing elements from the radiation. The controller provides two-dimensional profile information regarding the object based upon the time that each sensing element is blocked.

In one example, the controller determines a start time for each sensing element when the object begins to block the element from the radiation. The controller also determines a stop time for each sensing element when the object ceases to block the element from the radiation. The controller uses a time difference between the start time and stop time as the time that the sensing element is blocked, which provides information regarding a corresponding portion of the object.

Advantageously, the start time and stop time information may be fed to a display that utilizes that information for drawing a series of image lines that collectively establish an image of the tested object. Utilizing this strategy minimizes the amount of information required by the display and facilitates faster results.

A method of determining a two-dimensional profile of an object according to this invention uses a sensor device that has a plurality of radiation sensing elements. The sensing elements are irradiated and the object of interest is moved relative to the sensing elements such that the object blocks the radiation from at least some of the sensing elements as the object moves past the sensing elements. The amount of time that the radiation is blocked from each sensing element is determined. Two-dimensional profile information regarding the object is determined based upon the time that each sensing element is blocked.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 schematically illustrates a sensor device designed according to one implementation of this invention.

FIG. 2 schematically illustrates one way of using a sensor designed according to this invention.

FIG. 3 diagrammatically illustrates another way of using the inventive sensor.

DETAILED DESCRIPTION OF THE PREFERRED EMBODIMENTS

Figure 4:
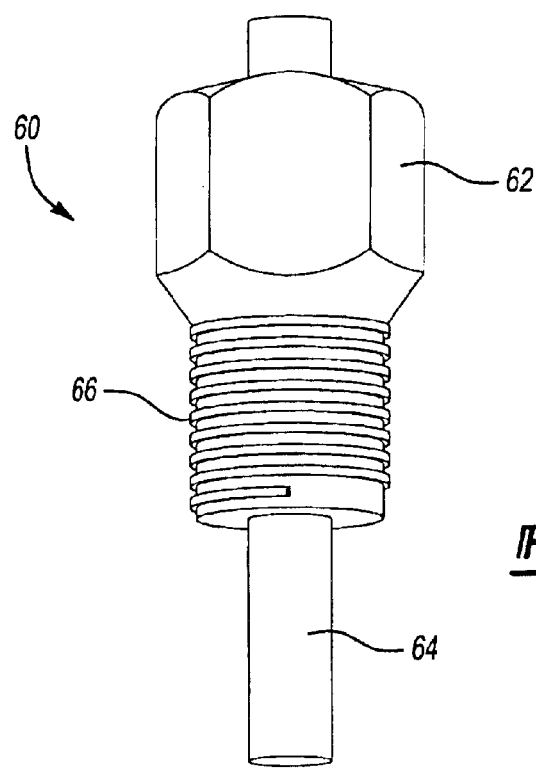
FIG. 4 schematically illustrates an example object that may be monitored using a sensor designed according to this invention.

FIG. 1 schematically illustrates a sensor device 20 designed according to this invention. That provides two-dimensional profile information regarding an object. The sensor device 20 includes a housing 22 that supports a source of radiation 24 and a plurality of radiation sensing elements 26. In one example, the radiation source 24 is a laser and the sensing elements 26 are photo detector sensors. The illustrated example includes a masking element 28 that is configured to focus the radiation from the radiation source 24 onto the sensing elements 26.

The sensor device 20 includes a controller 30 that performs the various calculations and determinations that provide the two-dimensional object profile information, which the inventive sensor device obtains. The example controller 30 includes a profile determining module 32 and a timer module 34. The modules schematically illustrated within the controller 30 are distinctions for discussion purposes. Each module may comprise software, firmware, dedicated circuitry or a combination of those. Those skilled in the art who have the benefit of this description will be able to decide how to implement a controller to be consistent with the controller 30 of this description. The choice between software and dedicated circuitry, for example, will depend upon the particular needs of a given situation.

Figure 5:
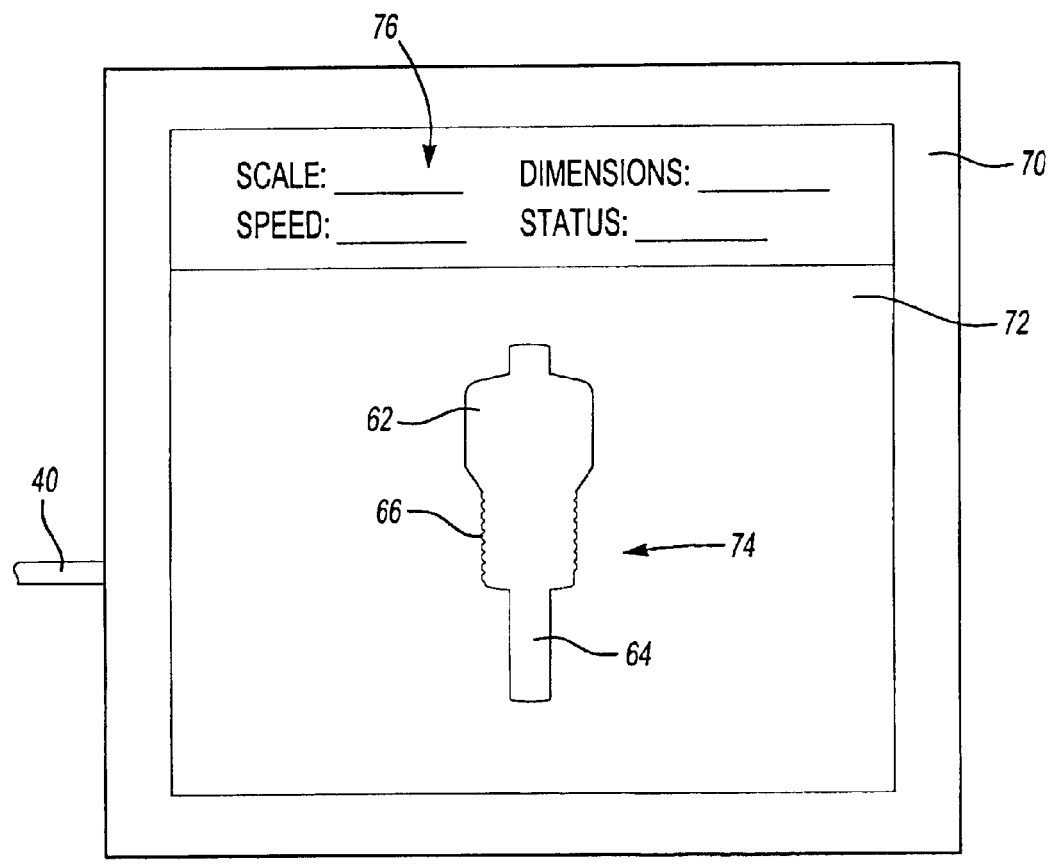
FIG. 5 schematically illustrates a two-dimensional profile display of the part of FIG. 4 obtained using a sensor designed according to this invention.

The sensor device 20 includes a connection 40 that allows for powering the device 20 and communicating various information or signals from the controller 30 to another device such as a display (as shown in FIG. 5, for example).

The sensor device 20 provides two-dimensional object profile information for an object that is passed through the spacing 41 between the source of radiation 24 and the sensing elements 26. The inventive sensor device allows for the object to be moved at any speed as needed to meet the needs of a particular situation, within a manufacturing assembly process for example. The unique profile determination methods of the inventive arrangement do not put constraints on the position of the object relative to the sensing elements or the speed with which the object is moved past them.

FIG. 2 illustrates one example implementation where a tube 50 is moved past the sensing elements 26 so that the tube 50 temporarily blocks some of the sensing elements 26 from the radiation of the radiation source 24. A formed end 52 of the tube and a rib portion 54 have a different two-dimensional profile than a remainder of the body of the tube 50. As the tube 50 is moved according to the arrow 56, the various portions of the tube 50 block the radiation from different ones of the sensing elements 26 for different amounts of time depending upon the width (from right to left according to the illustration) of the tube 50. The height or length dimensions (top to bottom according to the drawing) can be determined based upon the relative locations of the different sensing elements that are blocked by the different portions of the tube 50.

The inventive sensor arrangement provides two-dimensional profile information by utilizing information regarding which of the sensing elements 26 are blocked from the radiation source by the different portions of the tube 50 and the amount of time that each sensing element is blocked. These two categories of information enable the controller 30 to make a determination regarding the two-dimensional profile of the object that interrupts the radiation otherwise incident on the sensing elements 26.

The number of sensing elements 26 and the spacing between them determines the resolution of the sensor device in the direction along the row or array of sensing elements 26. In one example, 512 sensing elements are provided so that relatively minute detail regarding a test object is available. The sampling rate at which the sensing elements outputs are gathered provide the resolution capabilities in the direction across the sensing element array. In one example, each sensing element is sampled for about 500 nanoseconds. Assuming 500 individual sensing elements, each element is sampled once about ever 2.5 milliseconds.

FIG. 3 schematically illustrates the tube 50 passing through the spacing between the radiation source 24 and the sensing elements 26 when the tube is in a different orientation compared to that in FIG. 2. As the tube 50 is moved according to the arrow 58, the times associated with the amounts of radiation blocking the sensing elements 26 provides information regarding the height or length (right to left according to FIG. 3) of the various portions of the tube 50. Information regarding which ones of the sensing elements 26 are blocked from the radiation provides an indication of the width (top to bottom according to FIG. 3) of the tube 50 in this example.

The timing information gathered by the controller 30 is based upon the beginning and ending of when each sensing element 26 is blocked from the radiation source 24. The controller 30 preferably monitors the start time and stop time at which each sensing element is blocked. In one example, each sensing element 26 provides a digital signal (i.e., a pulse) to the controller that indicates the time during which the radiation is blocked. The length of time between the start time and the stop time corresponds to the dimension of the portion of the object passing by each sensing element. The controller 30 preferably is capable of determining a plurality of start times and stop times for each sensing element for each individual test object. This allows for determining the size and location of openings or adjacent but separate portions of an object, for example.

The timer module 34 provides reference information so that the states of all of the sensing elements 26 are captured in the same pattern, at the same interval rate. By maintaining the start times and stop times relative to the timer module 34, the periods between each start time and stop time are known against a reference value and are known relative to each other.

In one example, the timer module 34 comprises a digital counter that operates at a selected frequency.

By utilizing start time and stop time information, the controller 30 is able to more efficiently utilize memory and minimize the processing time required to generate a two-dimensional profile of a test object. Various criteria regarding the test object are nearly instantly available such that the inventive device provides significant time savings compared to conventional arrangements that relied upon counting pixels in a bit map.

In one example, the controller 30 provides the start time and stop time information for each sensing element 26 to a computer or other display device that is able to generate a visible image of the two-dimensional profile of the test object based upon only the start time and stop time information. In such an arrangement, the display device utilizes the start times and stop times as indicators for when to begin and end drawing a line corresponding to the location of the appropriate sensing element. This approach for generating a visual display provides significant advantages rendering the inventive sensor device faster and more economical than other arrangements.

The inventive arrangement is operable independent of variations in the speed with which an object moves through the sensing window 41 of the device 20. In one example, the sensor device 20 is provided with a sample part that has known dimensions which the controller utilizes to compare with subsequent measurements. As can be appreciated, if a first part moves through the sensing window at a first speed and a second part having identical dimensions moves through the sensing window at a second, slower speed, the time of blocked radiation for each sensing element will be greater in the second instance. The two parts should have the same profiles. The controller 32 preferably is programmed to utilize the sample test part information to normalize the obtained timing information based upon the expected dimensions of the part. For example, if the ratio between the tube end 52 and the rib 54 has an expected value, that information can be used to normalize the timing information gathered as various tubes move through the sensing window at different speeds.

FIG. 4 schematically illustrates a test object 60 having a tube portion 64 with a connector 62 supported on the tube. A portion of the connector 62 has threads 66.

FIG. 5 schematically illustrates a display device 70 having a display screen 72 for showing a visual two-dimensional display 74 of the test object 60. As can be appreciated from the drawing, even the threads 66 are viewable in the image 74. The image 74 is generated, for example, by the display device 70 receiving the start time and stop time information from the controller 30 over the connection 40 and the display screen 72 includes a dark horizontal line corresponding to the location of each sensing element 26 and the time during which each element is blocked from the radiation source by the object 60. The number of display pixel rows corresponding to a sensing element 26 will depend on the needs or preferences in a particular situation.

In the illustrated example, the display also includes an information portion 76 where items determined by the controller 30 such as the scale of the display, the dimensions of the object and the speed with which the object moves through the sensing window are shown to an individual utilizing the display. A variety of display formats are within the scope of this invention. The display device 70 may be a handheld device, a computer screen or other visual display that is capable of displaying digital information.

Assuming the object 60 is moved through the sensing window 41 in an orientation like that shown in FIG. 2, the different widths of the tube 64 and the different portions of the connector 62 will cause different start times at various sensing elements 26 as the object 60 moves through the sensing window. The largest portion of the connector 62 will have the earliest start time and the latest stop time. Similarly, the threads 66 will have earlier start times and later stop times than the grooves between the threads. This timing information, once translated into line length by the display device, provides a two-dimensional profile that can be visually inspected to confirm the quality and characteristics of the test object.

The inventive sensor device has many uses. One particular application for a sensing device designed according to this invention is for monitoring the quality and characteristics of formed tube ends. Another example useful application of the inventive arrangement is for monitoring the quality and characteristics of stripped wire ends such as those used for making electrical connections and wire harnesses in the automotive industry.

Figure 6:
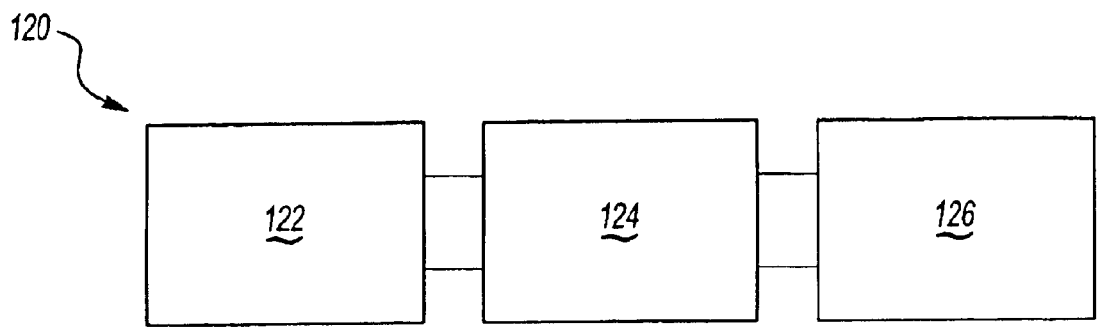
FIG. 6 schematically illustrates a wire assembly machine designed according to this invention.

FIG. 6 schematically illustrates a wire-processing machine 120. A conventional wire-stripping module 122 removes a desired amount of insulation from an end of a conductive wire. A measuring module 124, which includes a sensor device 20, determines the amount of insulation that was removed by the module 122 and other characteristics of the wire. An assembly module 126 utilizes wires that have been approved by the measuring module 124 and connects the wires to respective terminals to complete an assembly operation. The assembly module 126 operates in a conventional manner.

Figure 7:
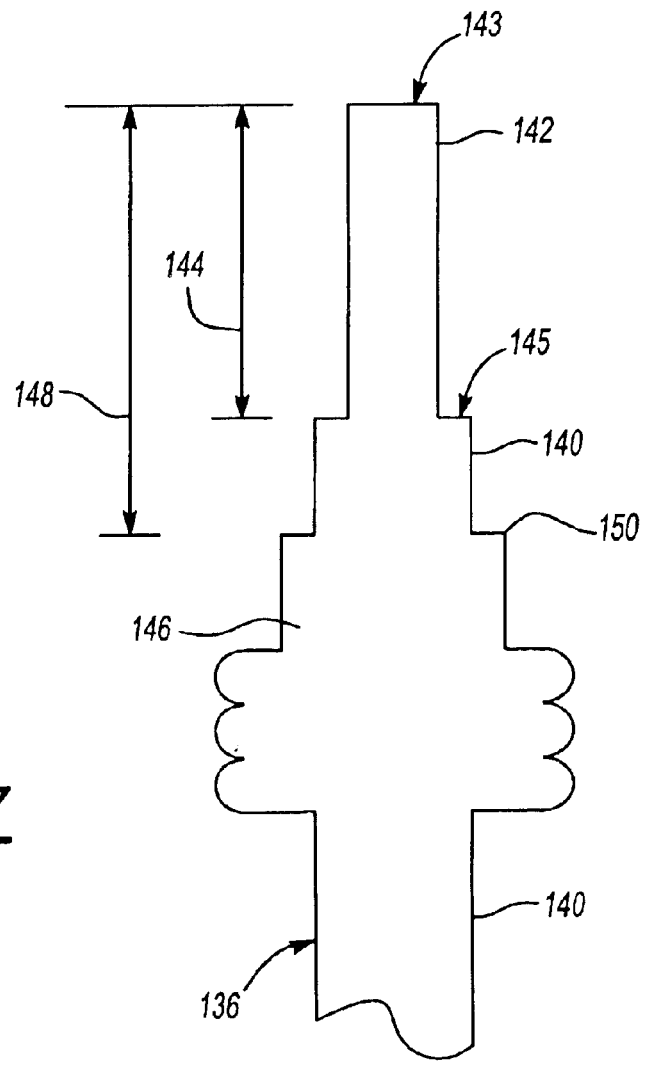
FIG. 7 schematically illustrates example object characteristics that the inventive sensor can be used to analyze.

FIG. 7 schematically illustrates a wire sample 136 and example characteristics that the inventive sensor is capable of analyzing. As the wire sample 136 interrupts the radiation incident onto the sensing elements 26, a different output will be provided by the different sensing elements, depending on the size of the portion of the wire sample that is aligned with each individual element.

For example, an insulation layer 140 on the wire sample 136 does not interrupt the radiation incident on some of the sensing elements 26, but does interrupt the radiation incident on other sensing elements 26, for example. The exposed, conductive portion 142 of the wire interrupts the radiation that is otherwise received by still other sensing elements 26. Since the width of the insulation 140 is greater than the width of the conductive portion 142, the amount of radiation interrupted at the various sensors will not be the same as the wire sample 136 passes by the array of sensing elements 26. This difference in the amount of interrupted radiation provides the controller 30 with some of the information needed to determine the desired characteristics of the wire sample 136 as described above, for example. The output of each sensing element 26 (i.e., a digital pulse) provides information to the controller 30.

The wire sample 136 has insulation 140 and an exposed, conductive portion 142. The times associated with the outputs of the individual sensing elements 26 enables the device 20 to determine the information needed to establish the profile including the location of an end point 143 on the conductive portion 142. The location of the end point 143 is determined, for example, by monitoring which of the sensing elements 26 in the array is blocked by the conductive portion 142 while an adjacent sensing element is not blocked. The end point 143 can be established to be at the location of the sensing element that is blocked and is adjacent to one that is not.

The ability to locate the end of a wire sample is particularly advantageous since exact placement of the wires is not needed, when this invention is utilized. The device is capable of handling wires that are placed within the sensing window 41, regardless of the exact location of the end point on the wire. Previous devices were not capable of this since they relied on exact placement of the end of the wire. Therefore, a device designed according to this invention is capable of inspecting a greater number of wires with greater speed and accuracy than was previously possible.

The controller 30 preferably also determines a length 144 of the conductive portion 142, by determining the relative locations of the end point 143 and a shoulder 145 of the insulation 140. The shoulder 145 can be located in a similar manner as the strategy for locating the end point 143, except that varying degrees of blocked radiation (i.e., different start and stop times) at adjacent sensing elements indicate the location of the shoulder 145.

The controller 30 not only determines the locations of the end point 143 and the shoulder 145, but also preferably determines the condition of the conductive portion 142 of the wire. FIGS. 8a through 8h show example two-dimensional profile images provided by the sensor output in cooperation with a display like that in FIG. 5. As shown in FIGS. 8b, 8c, 8d and 8e, it is possible to have various qualities or conditions of the exposed conductive portion 142. For example, the conductive portions 142b and 142c have been damaged because a portion of the conductive wire has been broken off or removed, perhaps during the stripping process. The conductive portion 142c includes a hole, which is determined because there are two start and two stop times for the corresponding sensing elements 26. The conductive portion 142d shows an example of wire splay. This example shows another situation where multiple start and stop times for at least some of the elements provides more accurate profile information. The wire splinters 156 each have their own start time and stop time at each sensing element that they pass (assuming the wire moves vertically according to FIG. 8D). The conductive portion 142e has been bent into a non-straight orientation, which may not be acceptable under some circumstances. The individual outputs of the individual sensing elements 26 and the associated timing information enables the controller 30 to determine when conditions such as those illustrated in FIGS. 8b through 8e are present.

In one example, the individual outputs of the sensing elements 26 can be summed to generate information regarding the area of the conductor. The summed information then is compared to a known or determined reference value. The comparison then provides information indicative of conditions such as cut strands, wire splay and a short strip.

The device 124 also is capable of determining the location and conditions of a seal member 146 on the wire 136. The controller 30 preferably determines a distance 148 between the end point 143 and the front end 150 of the seal member 146. The controller 30 preferably also determines the orientation and condition of the seal member 146. The individual outputs of the individual sensing elements enables the controller 30 to determine the location, orientation and condition of the seal member 146.

Figure 8A:
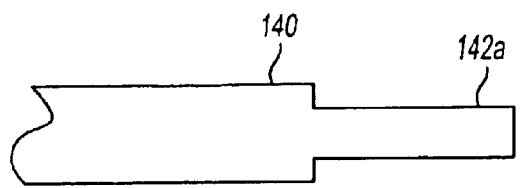
FIGS. 8a through 8h diagrammatically illustrate a plurality of two-dimensional images of wire samples, showing the different characteristics that can be determined using a device designed according to this invention.
Figure 8B:
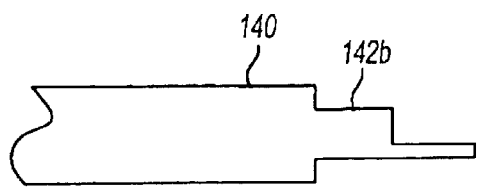
Figure 8C:
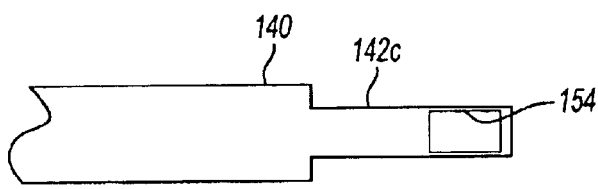
Figure 8D:
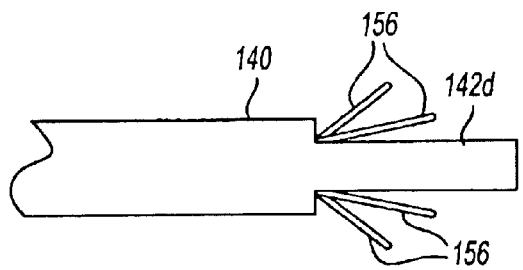
Figure 8E:
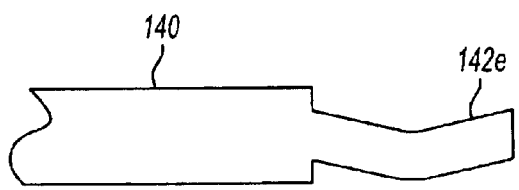
Figure 8F:
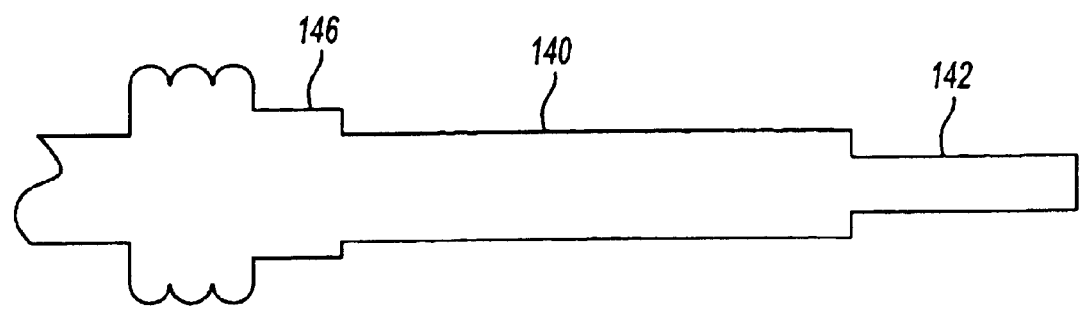
Figure 8G:
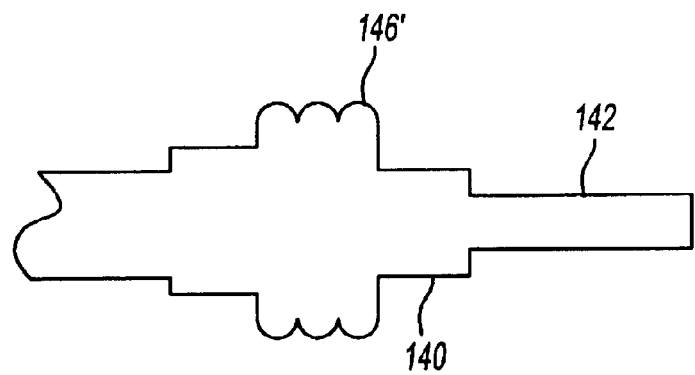
Figure 8H:
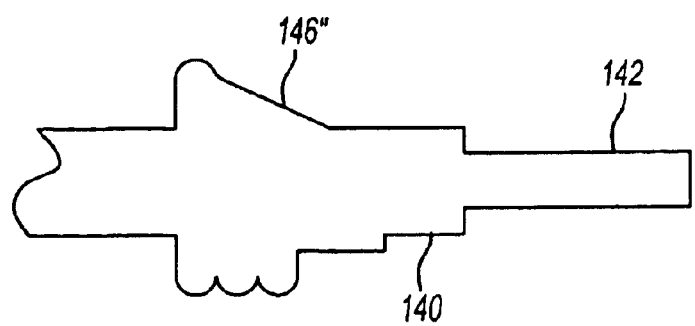

For example, the location of the seal member 146 may vary as shown in FIGS. 8f and 8g. Additionally, the orientation of the seal member may be reversed as can be seen by comparing the seal members 146 in FIG. 8f and the seal member 146' in FIG. 8g. Additionally, when a seal member has been damaged as illustrated in FIG. 8h, the controller 30 determines that the seal member 146" is not acceptable to accomplish a desired seal.

The individual sensing elements 26 provide enhanced capabilities that allow the device 124 to determine more characteristics of a wire sample compared with prior devices. Moreover, the specific adjustments and specific mechanical placements that were needed in prior devices are no longer a concern when a device designed according to this invention is utilized. Therefore, higher speeds can be used in a wire assembly machine with greater manufacturing economics.

Those who are skilled in the art have the benefit of this description will be able to program a computer or controller to determine the desired characteristics of a wire sample or another object of interest. A significant advantage is provided by this invention because a two-dimensional profile of the wire sample is effectively created, which indicates the multiple characteristics of the wire sample that may need to be monitored.

The device 124 preferably is taught the expected wire characteristics by placing the controller 30 into a learn mode utilizing a manual switch, for example. When the device 124 is placed into the learn mode, a known wire having the desired characteristics is passed through the inspection window. The controller 30 then determines, based upon the output of the sensing elements 26, the target conductor location, the target conductor diameter, the target conductor splay diameter and, when a seal is present, the target seal location. When other characteristics may be needed, the controller 30 is provided with information regarding those target dimensions or locations in the learn mode. Tolerances are applied to each of the target values and then the device 124 is prepared to inspect a plurality of wire samples. The information gathered in the learning mode is useful for normalizing dimensions obtained for wires moving past the sensing element 26 at different speeds.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device comprising:

a source of radiation;

a plurality of radiation sensing elements spaced from the source of radiation; and a controller that determines an amount of time that an object moving through the spacing between the radiation source and the sensing elements blocks each of the sensing elements from the radiation and provides two-dimensional profile information regarding the object based upon the time that each sensing element is blocked.

2. The device of claim 1, wherein the controller determines a start time for each sensing element when the object begins to block the element from the radiation and determines a stop time for each sensing element when the object ceases to block the element from the radiation and uses a time between the start time and the stop time as the time that the sensing element is blocked.

3. The device of claim 2, including a timer and wherein the controller determines the time that the sensing element is blocked relative to information from the timer.

4. The device of claim 2, including a display that provides a visual indication of the two dimensional profile based upon the start time and the stop time for each sensing element.

5. The device of claim 4, wherein the display draws a line indicating the amount of blocked radiation at each one of the sensing elements, each line having a length corresponding to the time between the start and stop time for the corresponding sensing element.

6. The device of claim 2, wherein the controller determines a plurality of start times and a corresponding plurality of stop times for at least one of the sensing elements for a corresponding object that moves through the spacing.

7. The device of claim 1, wherein the controller determines whether each sensing element is blocked a plurality of times while the object moves through the spacing and wherein each time is less than about 500 nanoseconds per sensing element.

8. The device of claim 1, wherein the controller determines the amount of time that radiation is blocked independent of a speed that the object moves through the spacing.

9. The device of claim 8, wherein the controller has an expected dimension of a reference portion of a sample object and the controller uses the expected dimension and a determined dimension of a corresponding portion of the object that moved through the spacing to establish a timing relationship between the expected dimension and the determined dimension and the controller uses the timing relationship as needed to adjust all determined times that radiation is blocked.

10. The device of claim 1, wherein the controller determines a location of an edge of the object based upon an output from one of the sensing elements indicating no blocked radiation and an output from an adjacent one of the sensing elements indicating an amount of blocked radiation.

11. The device of claim 1, wherein the controller determines a two-dimensional profile of an end of a formed tube.

12. The device of claim 11, wherein the controller determines a location of an object supported on the tube and determines a two-dimensional profile of the object.

13. The device of claim 1, wherein the controller determines a two-dimensional profile of an end of a conductive wire having insulation over at least some of the wire.

14. A method of determining a two-dimensional profile of an object using a sensor device having a plurality of radiation sensing elements, comprising the steps of;

irradiating the sensing elements;

moving the object relative to the sensing elements such that the object blocks the radiation from at least some of the sensing elements;

determining an amount of time that the radiation is blocked from each sensing element; and determining two-dimensional profile information regarding the object based upon the time that each sensing element is blocked.

15. The method of claim 14, including determining a start time for each sensing element when the object begins to block the element from the radiation and determining a stop time for each sensing element when the object ceases to block the element from the radiation.

16. The method of claim 15, including determining a number of timer increments between the start and stop time for each sensing element.

17. The method of claim 15, including determining a plurality of start times and a corresponding plurality of stop times for at least one of the sensing elements for a single object.

18. The method of claim 14, including generating a visual representation of the determined profile by establishing a line corresponding to each sensing element wherein each line length corresponds to the amount of time that each sensing element is blocked.

19. The method of claim 14, including determining the amount of time that radiation is blocked independent of a speed that the object moves relative to the sensing elements.

20. The method of claim 19, including determining an expected dimension of a reference portion of a sample object and using the expected dimension and a determined dimension of a corresponding portion of the object that moved relative to the sensing elements to establish a timing relationship between the expected dimension and the determined dimension and using the timing relationship as needed to adjust all determined times that radiation is blocked.

* * * * *